United States Patent
Wilson

(10) Patent No.: US 10,557,741 B2
(45) Date of Patent: Feb. 11, 2020

(54) FLUID LEVEL VISUALIZATION SYSTEMS

(71) Applicant: Trico Corp., Pewaukee, WI (US)

(72) Inventor: Jay Wilson, Milwaukee, WI (US)

(73) Assignee: Trico Corp., Pewaukee, WI (US)

(*) Notice: Subject to any disclaimer, the term of this patent is extended or adjusted under 35 U.S.C. 154(b) by 453 days.

(21) Appl. No.: 15/348,233

(22) Filed: Nov. 10, 2016

(65) Prior Publication Data

US 2017/0138777 A1 May 18, 2017

Related U.S. Application Data

(60) Provisional application No. 62/255,053, filed on Nov. 13, 2015.

(51) Int. Cl.
*G01F 23/02* (2006.01)
*F16L 55/00* (2006.01)

(52) U.S. Cl.
CPC .............. *G01F 23/02* (2013.01); *F16L 55/00* (2013.01)

(58) Field of Classification Search
CPC ................................. G01F 23/02; F16L 55/00
USPC ................... 73/323, 326, 328; 116/227, 276; 285/125.1–133.6
See application file for complete search history.

(56) References Cited

U.S. PATENT DOCUMENTS

| | | | | |
|---|---|---|---|---|
| 5,323,653 A * | 6/1994 | Gruett | ..................... | G01K 13/02 374/E13.006 |
| 5,442,959 A | 8/1995 | Mills | | |
| 6,142,171 A * | 11/2000 | Hancock | ................ | F16K 27/003 137/271 |
| 6,234,018 B1 * | 5/2001 | Kelada | ..................... | F16K 17/26 73/323 |
| 6,532,815 B2 * | 3/2003 | Wech | ....................... | G01F 23/02 73/323 |
| 6,758,092 B2 | 7/2004 | Wech et al. | | |
| 6,928,716 B2 | 8/2005 | Wech et al. | | |
| 8,794,173 B2 * | 8/2014 | Bluemner | ................ | G01F 23/64 116/276 |
| 9,557,206 B2 * | 1/2017 | Wech | ....................... | G01F 23/02 |
| 10,161,778 B2 * | 12/2018 | Wilson | ..................... | G01F 23/02 |
| 10,288,278 B2 * | 5/2019 | Nelson | ..................... | F22B 37/52 |
| 2016/0377472 A1 * | 12/2016 | Wech | ....................... | G01F 23/02 73/326 |

* cited by examiner

*Primary Examiner* — Natalie Huls
*Assistant Examiner* — Jermaine L Jenkins
(74) *Attorney, Agent, or Firm* — Andrus Intellectual Property Law, LLP

(57) ABSTRACT

A sight gauge assembly for displaying a fluid level of an object includes a first connection member comprising a tap defining a bore therethrough and a body comprising a first passageway and a second passageway such that the first passageway fluidly connects to the second passageway and the bore through an interior of the body and the second passageway to fluidly communicates with the first bore and a first accessory. The sight gauge assembly also includes a second connection member comprising a tap defining a bore therethrough and a body comprising a first passageway and a sight tube defining a hollow interior. The sight tube couples to the first connection member and the second connection member to define a first flow path.

17 Claims, 5 Drawing Sheets

FLUID LEVEL VISUALIZATION SYSTEMS

CROSS-REFERENCE TO RELATED APPLICATION

The present application claims priority to U.S. Provisional Application No. 62/255,053 filed on Nov. 13, 2015, which is hereby incorporated herein by reference.

FIELD

The present disclosure relates to fluid level visualization systems, specifically fluid level visualization systems that include sight gauges.

BACKGROUND

Objects, equipment, machines, and/or gearboxes often require that a proper fluid level or lubrication level be maintained and conditioned for safe and effective operation. Maintaining the proper fluid level can reduce friction, overheating, contamination, and wear of the internal mechanical components, and failure to maintain the proper fluid level can result in failure of the object and/or costly repairs. Often, objects themselves are opaque or are fully enclosed with opaque housings or enclosures that make visually inspecting the fluid level in the object difficult. Accordingly, fluid level sight gauges are commonly used to display the fluid level in the object.

The following U.S. Patents disclosed example fluid level visualization systems and example sight gauges.

U.S. Pat. No. 5,442,959 discloses a sight gauge placed between two spaced apart compression type fittings connected to a vessel to show the liquid level in the vessel. The sight gauge has an elongated tubular transparent tube shield and a slightly longer elongated transparent sight tube that is received within the sight tube shield. An upper and a lower connection plate are each telescopically received by the sight tube, the sight tube shield being captured between the connection plates. An upper and a lower nozzle member each have an opening to respectively capture the upper and lower ends of the sight tube. An upper and lower elastomeric O-ring is received on the sight tube positioned between the connection plates and the nozzle members. Bolts secure the nozzle member to the compression plates to squeeze the O-rings against the sight tube so that the sight tube retains and supports the tube shield. Each nozzle member has an elongated tubular portion that can be received in a compression fitting.

U.S. Pat. No. 6,758,092 discloses a fluid level verification apparatus for use on liquid filled containers and configured to reduce inherent mechanical stresses on the inspection tube and resist leakage due to environmental, chemical, thermal or mechanical expansion cycles by using a protective shield member to encase the inspection sight member, and also a method for permanently sealing the fluid level detection apparatus.

U.S. Pat. No. 6,928,716 discloses a fluid level verification apparatus for use on liquid filled containers and configured to reduce inherent mechanical stresses on the inspection tube and resist leakage due to environmental, chemical, thermal or mechanical expansion cycles by using a protective shield member to encase the inspection sight member, and also a method for permanently sealing the fluid level detection apparatus.

SUMMARY

This summary is provided to introduce a selection of concepts that are further described herein below in the detailed description. This summary is not intended to identify key or central features of the claimed subject matter, nor is it intended to be used as an aid in limiting the scope of the claimed subject matter.

In certain examples, a sight gauge assembly for displaying a fluid level of an object includes a first connection member comprising a tap defining a bore therethrough and configured to extend through a housing of the object and a body comprising a first passageway and a second passageway wherein the first passageway fluidly connects to the second passageway and the bore through an interior of the body and the second passageway configured to fluidly communicate with the first bore and a first accessory; a second connection member comprising a tap defining a bore therethrough and configured to extend through the housing of the object and a body comprising a first passageway fluidly connected to the bore through an interior of the body of the second connection member; and a sight tube defining a hollow interior. The sight tube couples to the first connection member and the second connection member to define a first flow path through the hollow interior of the sight tube between the bore and first passageway of the first connection member and the first passageway and bore of the second connection member.

In certain examples, a fluid level visualization system includes a first connection member comprising a tap defining a bore therethrough and configured to extend through a housing and a body comprising a first passageway and a second passageway, the first passageway fluidly connected to the second passageway and the bore through an interior of the body and the second passageway configured to fluidly communicate with the first bore and a first accessory; a second connection member comprising a tap defining a bore therethrough and configured to extend through a housing, and a body comprising a first passageway fluidly connected to the bore through an interior of the body of the second connection member; and a sight gauge assembly having a sight tube configured to display a fluid level and defining a hollow interior. The sight tube fluidly couples to the first passageway of the first connection member and the first passageway of the second connection member to define a first flow path through the hollow interior of the sight tube between the bore and first passageway of the first connection member and the first passageway and the bore of the second connection member. The fluid level visualization system further includes a first accessory coupled to the second passageway of the first connection member such that the first accessory fluidly communicates with the first flow path.

In certain examples, a method of circulating the fluid through the object includes coupling a first connection member comprising a tap defining a bore therethrough and configured to extend through a housing of the object, coupling a second connection member comprising a tap defining a bore therethrough and configured to extend through the housing of the object, coupling a sight gauge assembly that has a sight tube defining a hollow interior to a first passageway of the first connection member and to a first passageway of the second connection member to define a first flow path through the hollow interior of the sight tube between the bore and first passageway of the first connection member and the first passageway and bore of the second connection member, coupling a first accessory to the second passageway of the first connection member such that the first accessory is fluidly connected to the first flow path, coupling a second accessory to the second passageway of the second connection member such that the second accessory is fluidly connected to the first flow path, coupling a circulation system to the first accessory and the second accessory to define a second flow path parallel to the first flow path and between the first connection member and the second connection member, and circulating the fluid from the object in a second flow path with the circulation system, the fluid circulating in the second flow path out of the object through the second connection member and the second accessory and back into the object through the first accessory and the first connection member.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Figure 1:
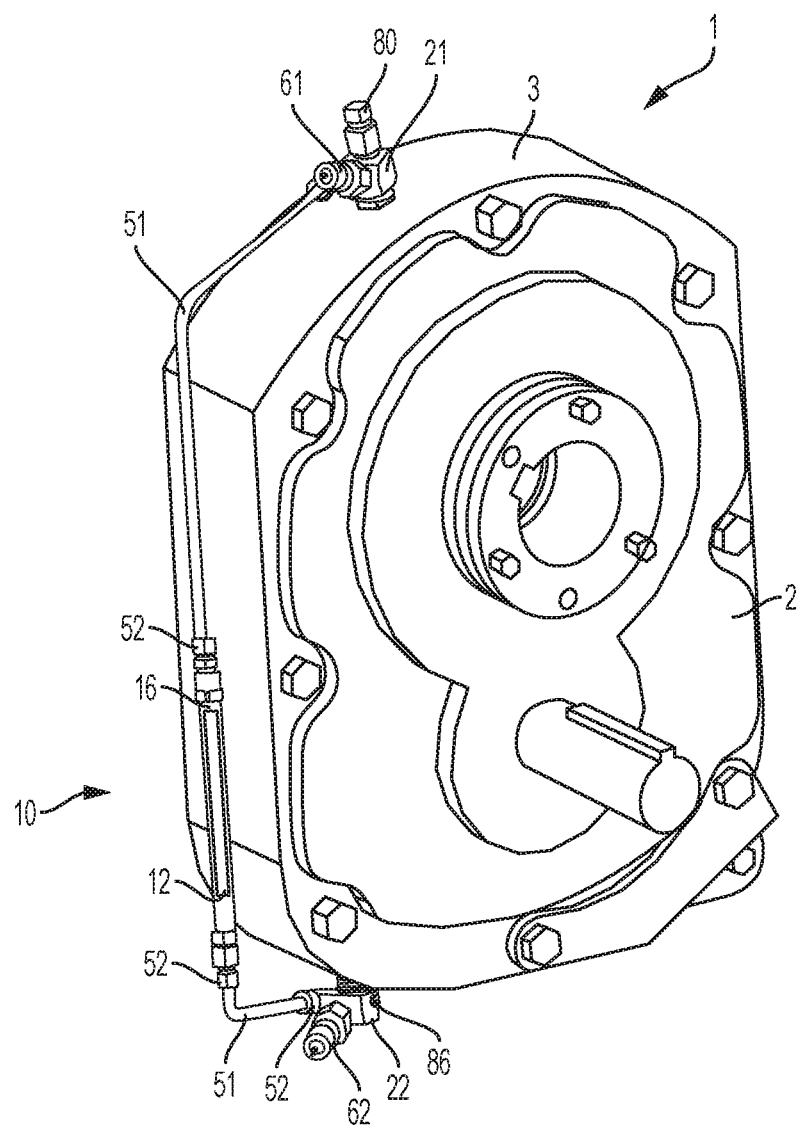
FIG. 1 is an example of a fluid level visualization system.

Referring to FIG. 1, a fluid level visualization system 1 includes a sight gauge assembly 10 that is coupled to an object 2 (e.g. a gearbox, oil drum). The sight gauge assembly 10 is configured to display a fluid level of a fluid (e.g. oil, lubricant) contained in the object 2. The object 2 includes a housing 3 that defines an interior space (not shown) that is configured to hold the fluid. The housing 3 can define any number of holes or openings that allow an operator to fill the object 2 with fluid and/or drain fluid from the object 2. In one non-limiting example, the object 2 includes a fill opening (not shown) and a drain opening (not shown). Any number of openings can be defined in the housing 3. Other accessories or devices, such as ventilators, desiccant breathers, fluid circulation systems, etc., can be coupled to the object 2 such that accessories or devices fluidly communicate with the openings. Furthermore, the openings can be used to extract a sample of the fluid from the object 2 for analysis (i.e. chemical and/or visual analysis). However, an object 2 with multiple openings defined in the housing 3 can increase the risk of fluid leaks and/or debris (e.g. dust, drill shavings) entering the interior space defined by the housing 3. Accordingly, the present inventor has endeavored to minimize the number of openings defined in the object 2 and/or use a single opening for multiple purposes (e.g. multiple accessories and/or devices fluidly communicate with the interior space defined by the object 2 via a single opening, fill the object 2 with the fluid, drain fluid from the object 2, extract a sample of the fluid from the object 2). As such, the present inventor has invented the fluid level visualization system 1 that has a sight gauge assembly 10 which displays the fluid level in the object 2, reduces of the number of openings that must be defined in the housing 3 of the object and increases number of accessories and/or devices that can fluidly communicate with a single opening.

The sight gauge assembly 10 includes a pair of connection members 21, 22 that are configured to couple to the housing 3 of the object 2. When coupled to the object 2, the first connection member 21 is spaced apart from the second connection member 22. Preferably, the first connection member 21 is coupled to the housing 3 vertically above a fluid level of a fluid within the object and the second connection member 22 is coupled to the housing 3 vertically below the fluid level of the fluid within the object. The sight gauge assembly 10 includes a sight tube 12 fluidly connected between the first connection member 21 and the second connection member 22. The sight tube 12 is exemplarily positioned to be vertically or horizontally oriented (depending upon the configuration of object 2) to be in positional alignment with the fluid level of the fluid contained in the interior space defined by the object 2. Due to the fluid connection between the interior of the object 2 and the sight tube 12, the sight tube 12 provides an indication representative of the fluid level of the fluid within the object 2.

In addition, preferably, the first connection member 21 and/or the second connection member 22 are coupled to the housing 3 at existing opening(s) defined in the housing 3. Additional opening(s) (i.e. a new openings(s)) can be further defined in the housing 3 (e.g. a new opening can be defined in the housing 3 by drilling) to accommodate the first connection member 21 and/or the second connection member 22, if needed. In certain examples, the connection member 21, 22 includes screw threads that engage with the object 2 to couple the connection member 21, 22 to the object 2. In still further embodiments, the connection members 21, 22 may be secured to the object 2, for example by friction fit or welding.

Figure 2:
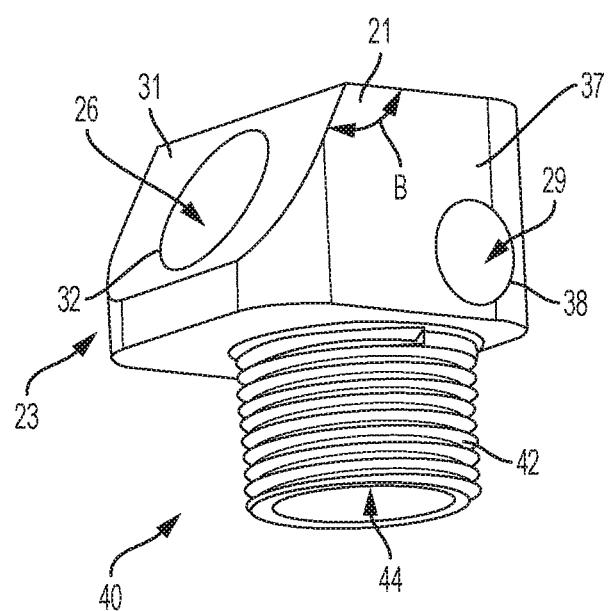
FIG. 2 is a front perspective view of a connection member.
Figure 3:
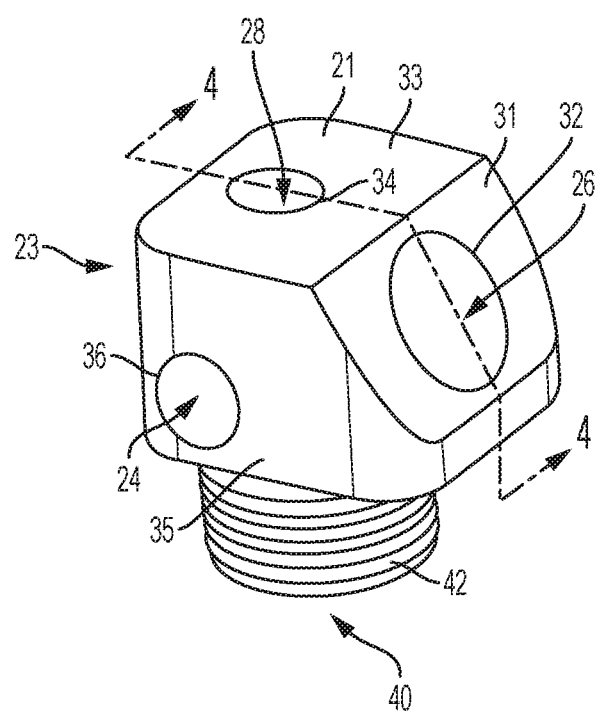
FIG. 3 is a rear perspective view of the connection member of FIG. 2.
Figure 4:
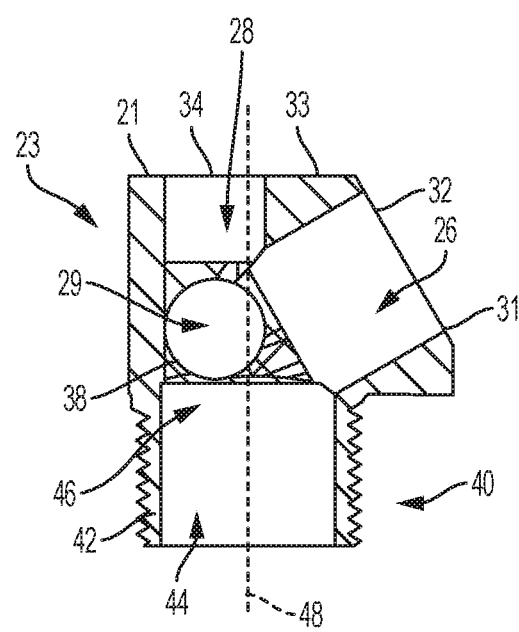
FIG. 4 is a cross section view of the connection member of FIG. 2 taken on 4-4 shown in FIG. 3.

FIGS. 2-4 depict an exemplary embodiment of first connection member 21. It will be recognized that second connection member 22 (FIG. 1) may exemplarily be the same as first connection member 21 and therefore the description herein of connection member 21 may similarly apply to embodiments of second connection member 22. The first connection member 21 and/or the second connection member 22 can include any other components and/or features as depicted an/or described with reference to FIGS. 2-4. It will further be recognized that in other embodiments, the first connection member 21 and the second connection member 22 may differ from each other while both remaining within the scope of the present disclosure.

The connection member 21 exemplarily comprises a body 23 and a tap 40 that extends away from the body 23. The body 23 is exemplarily a polyhedron in the example depicted, although it will be recognized that the connection member 21 and body 23 may take other shapes while remaining within the scope of the present disclosure. The exemplary polyhedron shape of the body 23 is provided by an end 33 opposite the tap 40. Side 35 is exemplarily opposite side 37, and both side 35 and side 37 are orthogonal to the end 33. The body 23 further includes a face 31, which is exemplarily orthogonal to the sides 35, 37 and angled relative to the end 33. In an exemplary embodiment, the face 31 and the end 33 form an obtuse angle B.

The tap 40 is configured to extend through the housing 3 of the object 2, when the connection member 21 is mounted to the object 2. The tap 40 is configured with threads 42 for an exemplary threaded connection with the housing 3, although it will be recognized as noted above that the tap 40 may be connected in a fluid-tight manner through the housing 3 in a variety of ways as will be recognized by a person of ordinary skill in the art. The tap 40 includes a bore 44 that creates a fluid connection between the inside of the housing 3 and the interior 46 (FIG. 4) of the connection member 21.

The connection member 21 includes a plurality of ports as described herein that fluidly connect to the interior 46 of the connection member 21 by way of a plurality of passages. A face passageway 26 exemplarily extends into the connection member 21 from a face port 32 in the face 31. Side passageways 24, 29 extend into the connection member 21 respectively from side ports 36, 38 in the sides 35, 37. An end passageway 28 extends into the connection member 21 from an end port 34 in the end 33. In an exemplary embodiment, the passageway 26 extends perpendicular to face 31, passageway 24 extends perpendicular to side 35, passageway 29 extends perpendicular to side 37, and passageway 28 extends perpendicular to end 33.

As best depicted in FIG. 4, in an exemplary embodiments each of the ports 32, 34, 36, 38 are positioned offset from a central axis 48 of the bore 44. In an exemplary embodiment, the centers of side ports 36, 38 and the end port 34 are all offset from the central axis 48 in a direction opposite from the face 31. The entire face 31 is exemplarily offset from the central axis 48 of the bore 44, therefore it logically follows that the center of the face port 32 may similarly be offset from the central axis 48. In a still further exemplary embodiment, the center of the face port 32 is outside of the circumference of the tap 40, as the face 31 extends in a direction beyond the tap 40.

By way of the connection member 21, the fluid connection between the inside of the housing 3 is established through the bore 44 and the interior 46 to each of the passageways 24, 26, 28, 29. The flow of fluid may be either into or out of the object 2 through the fluid connection provided by the connection member 21, 22 as described in further detail herein. This provides a flexibility and an adaptability to the connection member 21, 22 to simultaneously support a sight gauge assembly 10 as described in further detail herein along with a plurality of accessories.

Referring back to FIG. 1, the sight tube 12 defines a hollow interior (not shown), and the sight tube 12 is coupled to the connection members 21, 22 such that the hollow interior fluidly communicates with one of the passageways 24, 26, 28, 29 of the connection members 21, 22. In an exemplary embodiment, the sight tube 12 is fluidly connected to one of the side passageways 24, 29. In an exemplary embodiment, the selection of one of the side passageways 24, 29 can position the sight tube 12 to least obstruct access to the other passageways of the connection members 21, 22. The hollow interiors 46 of the connection members 21, 22 in combination with the sight tube 12 of the sight gauge assembly 10 define a flow path through which the fluid in the object 2 can flow such that the fluid level of the fluid in the object 2 is displayed. For example, when the first connection member 21 and the second connection member 22 positioned vertically above and below, respectively, the fluid level of the fluid in the object 2 and the sight tube 14 is vertically positioned between the first connection member 21 and the second connection member 22, the fluid flows into the sight tube 12 such that the fluid level is displayed by the sight tube 12. The sight tube 12 is transparent and configured to display the fluid level. The sight gauge assembly 10 includes a guard 16 configured to partially surround the sight tube 12 and protect the sight tube 12.

As will be described in further detail herein with respect to FIG. 5, the passageways 24, 26, 28, 29 are each configured to receive any of a plurality of accessories which may be described in further detail herein. In an exemplary embodiment, the ports 32, 34, 36, 38 and passageways 24, 26, 28, 29 exemplarily comprise a plurality of different diameters. In a non-limiting exemplary embodiment, the side ports 36, 38 and the end port 34 are exemplarily ¼ inch in diameter, while the face port 32 is exemplarily ½ inch in diameter. It will be recognized that in other embodiments other diameters and/or other combinations of diameters may be used. The respective ports/passageways may exemplarily be threaded, such as to threadingly receive the accessories as described in further detail herein, in addition to the sight gauge assembly 10. The ports/passageways may exemplarily allow an operator to extract (or drain) a sample of the fluid from the object for analysis. In still further exemplary embodiments, the ports/passageways may be configured for other forms of fluid-tight connections, for example friction fit.

In exemplary embodiments, an adapter 80 accommodates connection of an accessory (e.g. a desiccant breather) of an exemplary different diameter or connection method to an available port of the connection member 21, 22. By way of the interior 46 of the connection members 21, 22 the bore and the passageways 24, 26, 28, 29 can fluidly communicate with each other such that fluid flow into and between the passageways 24, 26, 28, 29. Therefore, in another exemplary embodiment, one or more of the passageways 24, 26, 28, 29 may be used as a drain.

Figure 5:
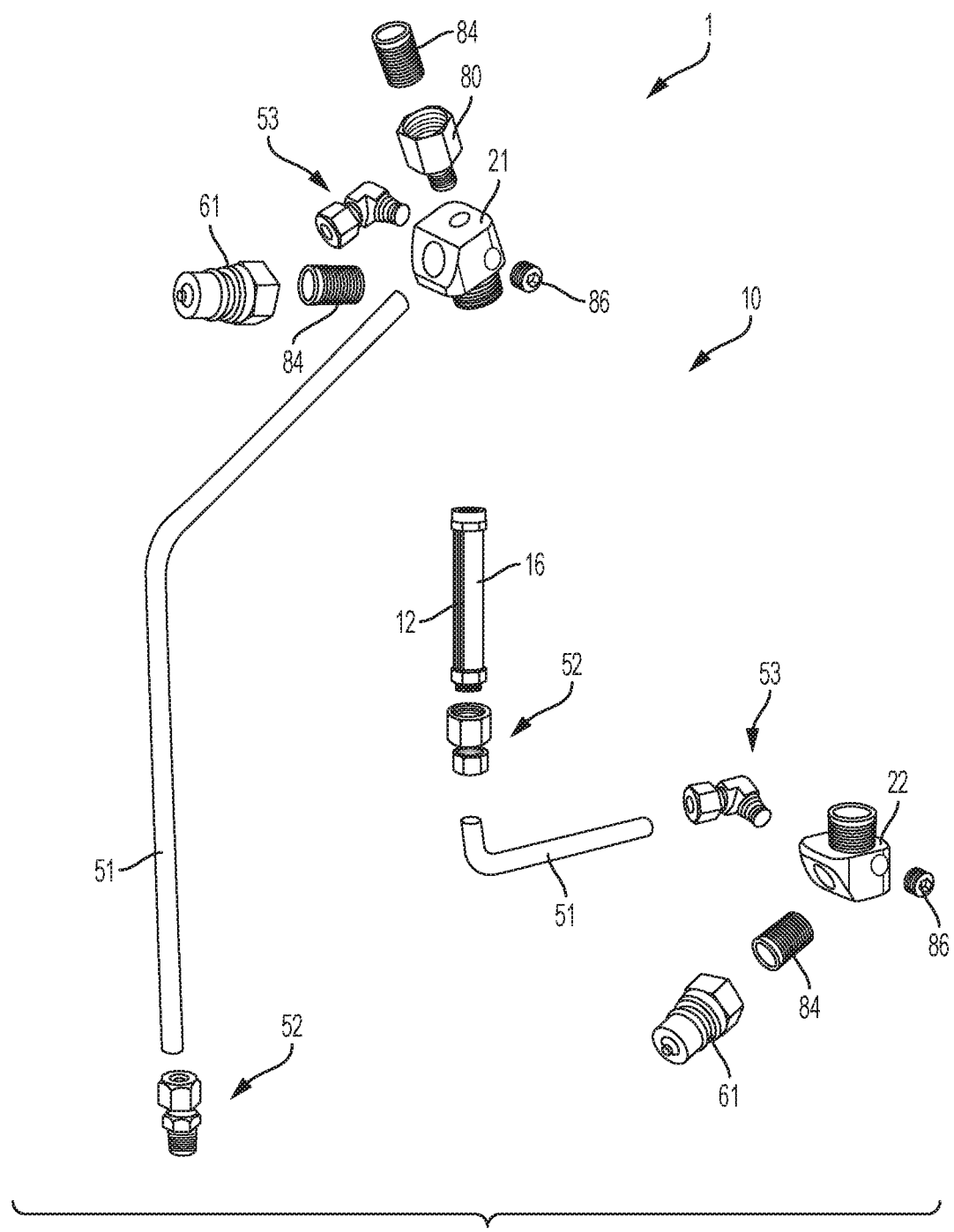
FIG. 5 is an exploded view of a sight gauge assembly.

Referring to FIG. 5, the sight gauge assembly 10 further includes tubes or piping 51 and/or a plurality of fittings that couple the sight tube 12 and/or the guard 16 to the connection members 21, 22, as described above. The piping 51 and the fittings allow the operator to manipulate construction of the sight gauge assembly 10 such that the sight gauge assembly 10 can be used with any type of object 2. For example, a large length of piping 51 can be utilized to ensure that the sight tube 12 (see FIG. 1) is positioned in an accessible and operable position (i.e. the sight tube 12 can be accessed by the operator and the level of the fluid is indicated or displayed by the sight tube 12). The piping 51 can be made of any suitable material such as plastic, rubber, and/or the like, and the piping 51 is malleable (i.e. the piping 51 can be bent, stretched, and/or compressed). In one example, the piping 51 is made of brass and has a ⅜ inch outside diameter. The type of fittings can vary, and the sight gauge assembly 10 may include one type of fitting or a combination of several types of fittings. The fittings can be adhesive fittings, compressive fittings, welded connections, clamping devices, and/or the like. Preferably, the fittings are liquid tight and NIP or NPTF certified. In one exemplary embodiment, linear compressive fittings 52 couples first ends of the piping 51 to the sight tube 12 and/or the guard 16 and elbow compressive fittings 53 couple opposite second ends of the piping 51 to the connection members 21, 22. The elbow compressive fittings 53 enable the operator to rotate and/or position the sight tube 12 and/or guard 16 relative to the connection members 21, 22. The elbow compressive fittings 53 also enable the operator to manipulate construction of the sight gauge assembly 10 to such that the sight tube 12 provides an indication representative of the fluid level within the object 2, as described above.

The connection members 21, 22 of the sight gauge assembly 10 are configured to received and/or couple with accessories such that the accessories fluidly connect with the interior space of the object 2, the passages of the connection members 21, 22 and/or the first flow path (as described above) that extends through the sight tube 12. The type and number of accessories can vary, and the accessories are configured with threads for an exemplary threaded connection with the connection members 21, 22, although it will be recognized that the accessories may be connected in a fluid-tight manner in a variety of ways as will be recognized by a person of ordinary skill in the art. The types of accessories that can be utilized include, but are not limited to, fluid piping, ventilation systems, fluid circulation systems, air hoses, valves (including ball valves, check valves, quick disconnect valves 61, 62, etc.), adapters 80, close nipples 84, socket plugs 86, and/or the like.

In an exemplary embodiment, first quick disconnect valve 61 is coupled to the first connection member 21 and the second quick disconnect valve 62 is coupled to the second connection member 22 such that a fluid circulation system (not shown) can be coupled to the quick disconnect valves 61, 62. The fluid circulation system is configured to draw the fluid contained in the object 2 out through second connection member 22 and further convey the fluid to the first connection member 21 such that the fluid returns back to the object 2 thereby circulating the fluid through the object 2. As the fluid is conveyed between quick disconnect valves 61, 62 the fluid can be processed in any number of ways including filtration, heating, adding chemical additives, and/or adding supplemental or new fluid. The fluid circulation system defines a second flow path that is parallel to the first flow path. In certain examples, the fluid circulation system is a kidney loop filtration system that draws the fluid from the object 2, filters the fluid, and returns the fluid to the object 2. In certain examples, the fluid circulation system applies a sucks or draws the fluid out of the object via a quick disconnect valve and/or a connection member.

In another exemplary embodiment, an adapter 80 is configured to provide a connection for devices that are not capable of directly coupling to the first connection member 21 (e.g. the threads of the device are different than the treaded connection of the first connection member 21). The adapter 80 includes a first end that couples with the first connection member 21 and a second end opposite the first end that couples with and/or receive the device such as to fluidly connect the device to the passages defined by the first connection member 21. In another exemplary embodiment, close nipples 84 having two male connection ends are coupled to the connection members 21, 22 to allow accessories having female connections to be coupled to the connection members 21, 22.

In another exemplary embodiment, socket plugs 86 are configured couple to the connection members 21, 22 to block flow of the fluid through a passage. Multiple socket plugs can be coupled to connection members 21, 22 to block passages and ports when the passages and/or ports are not in use (i.e. when an accessory is removed from the connection member 21, 22). The socket plugs 86 can be utilized as drain plugs (i.e. the fluid may drain from the object 2 when the socket plug 86 is removed) and/or sample taps (i.e. the socket plug 86 can be removed so that sample of the fluid in the object 2 can be extracted or drained for analysis)

The present disclosure includes methods for displaying the fluid level of the fluid in the object and methods of circulating the fluid through the object. The methods can include coupling a first connection member comprising a tap defining a bore therethrough and configured to extend through a housing of the object, coupling a second connection member comprising a tap defining a bore therethrough and configured to extend through the housing of the object, coupling a sight gauge assembly that has a sight tube defining a hollow interior to a first passageway of the first connection member and to a first passageway of the second connection member to define a first flow path through the hollow interior of the sight tube between the bore and first passageway of the first connection member and the first passageway and bore of the second connection member, coupling a first accessory to the second passageway of the first connection member such that the first accessory is fluidly connected to the first flow path, coupling a second accessory to the second passageway of the second connection member such that the second accessory is fluidly connected to the first flow path, coupling a circulation system to the first accessory and the second accessory to define a second flow path parallel to the first flow path and between the first connection member and the second connection member, and circulating the fluid from the object in a second flow path with the circulation system, the fluid circulating in the second flow path out of the object through the second connection member and the second accessory and back into the object through the first accessory and the first connection member.

In the above description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sight gauge assembly for displaying a fluid level of an object, the sight gauge assembly comprising:
    a first connection member comprising a first tap defining a first bore therethrough and configured to extend through a housing of the object, and a body comprising a first side comprising a first port defining a first passageway, a face comprising a second port defining a second passageway, a second side opposite the first side and comprising a third port defining a third passageway, and an end orthogonal to the first side and the second side and opposite the first tap and comprising a fourth port defining a fourth passageway fluidly connected to the first bore, the first passageway fluidly connected to the second passageway and the first bore through an interior of the body, the second passageway configured to fluidly communicate with the first bore and a first accessory, wherein the face is orthogonal to the first side and the second side and the face is angled relative to the end;
    a second connection member comprising a second tap defining a second bore therethrough and configured to extend through the housing of the object, and a body comprising a first passageway fluidly connected to the second bore through an interior of the body of the second connection member; and
    a sight tube defining a hollow interior, the sight tube coupling to the first connection member and the second connection member to define a first flow path through the hollow interior of the sight tube between the first bore and the first passageway of the first connection member and the first passageway and the second bore of the second connection member.

2. The sight gauge assembly according to claim 1, wherein the end and the face define an obtuse angle therebetween, the second passageway extends into the body from the face at an angle perpendicular to the face, and the fourth passageway extends into the body from the end at an angle perpendicular to the end.

3. The sight gauge assembly according to claim 2, wherein the first passageway extends into the body from the first side at an angle perpendicular to the first side and to the fourth passageway.

4. A fluid level visualization system comprising:
a first connection member comprising a first tap defining a first bore therethrough and configured to extend through a housing, and a body comprising a first side comprising a first port defining a first passageway, a face comprising a second port defining a second passageway, a second side opposite the first side and comprising a third port defining a third passageway, an end orthogonal to the first side and the second side and opposite the first tap and comprising a fourth port defining a fourth passageway, wherein the first passageway is fluidly connected to the second passageway and the first bore through an interior of the body, wherein the second passageway is configured to fluidly communicate with the first bore, and wherein the face is orthogonal to the first side and the second side and the face is angled relative to the end;
a second connection member comprising a second tap defining a second bore therethrough and configured to extend through the housing, and a body comprising a first passageway fluidly connected to the second bore through an interior of the body of the second connection member; and
a sight gauge assembly having a sight tube configured to display a fluid level and defining a hollow interior, the sight tube fluidly couples to the first passageway of the first connection member and the first passageway of the second connection member to define a first flow path through the hollow interior of the sight tube between the first bore and the first passageway of the first connection member and the first passageway and the second bore of the second connection member; and
a first accessory coupled to the second passageway of the first connection member such that the first accessory fluidly communicates with the second passageway, the first bore, and the first flow path.

5. The system according to claim 4, further comprising a device adapter coupled between the second passageway and the first accessory, wherein the device adapter fluidly connects the first accessory to the first connection member.

6. The system according to claim 5, wherein the device adapter comprises an inlet having an inlet diameter that matches a diameter of the second passageway and an outlet diameter that matches a diameter of the first accessory.

7. The system according to claim 4, wherein the first accessory is a ventilation device.

8. The system according to claim 4, wherein the end and the face define an obtuse angle therebetween, wherein the second passageway extends into the body from the face at an angle perpendicular to the face, and wherein the fourth passageway extends into the body from the end at an angle perpendicular to the end.

9. The system according to claim 4, wherein the second connection member further defines a second passage that fluidly communicates with the first flow path; and further comprises a second accessory coupled to the second connection member at the second passage of the second connection member.

10. The system according to claim 4, further comprising:
an object having the housing that defines an interior space configured to contain the fluid and comprising a first opening that fluidly communicates with the interior space; wherein the first tap of the first connection member extends through the first opening to couple the first connection member to the object such that the first and second passageways of the first connection member fluidly communicate with the interior space of the object through the first bore of the first connection member.

11. The system according to claim 10, wherein the housing comprises a second opening that fluidly communicates with the interior space and wherein the second tap of the second connection member extends through the second opening to couple the second connection member to the object such that the first passageway of the second connection member fluidly communicates with the interior space of the object through the second bore of the second connection member.

12. A fluid level visualization system comprising:
a first connection member comprising a first tap defining a first bore therethrough and configured to extend through a housing, and a body comprising a first passageway and a second passageway, the first passageway fluidly connected to the second passageway and the first bore through an interior of the body, the second passageway configured to fluidly communicate with the first bore;
a second connection member comprising a second tap defining a second bore therethrough and configured to extend through a housing, and a body comprising a first passageway fluidly connected to the second bore through an interior of the body of the second connection member; and
a sight gauge assembly having a sight tube configured to display a fluid level and defining a hollow interior, the sight tube fluidly couples to the first passageway of the first connection member and the first passageway of the second connection member to define a first flow path through the hollow interior of the sight tube between the first bore and the first passageway of the first connection member and the first passageway and the second bore of the second connection member; and
a desiccant breather coupled to the second passageway of the first connection member such that the desiccant breather fluidly communicates with the first flow path.

13. A fluid level visualization system comprising:
a first connection member comprising a first tap defining a first bore therethrough and configured to extend through a housing, and a body comprising a first passageway and a second passageway, the first passageway fluidly connected to the second passageway and to the first bore through an interior of the body, the second passageway configured to fluidly communicate with the first bore;
a second connection member comprising a second tap defining a second bore therethrough and configured to extend through a housing, and a body comprising a first passageway and a second passageway, the first passageway fluidly connected to the second passageway and to the second bore through an interior of the body of the second connection member; and
a sight gauge assembly having a sight tube configured to display a fluid level and defining a hollow interior, the sight tube fluidly couples to the first passageway of the first connection member and the first passageway of the second connection member to define a first flow path through the hollow interior of the sight tube between the first bore and the first passageway of the first connection member and the first passageway and the second bore of the second connection member;

a first valve comprising at least one valve selected from a check valve, a quick disconnect valve, and a ball valve, wherein the first valve is coupled to the second passageway of the first connection member such that the first valve fluidly communicates with the first flow path; and a second valve comprising at least one valve selected from a check valve, a quick disconnect valve, and a ball valve, wherein the second valve is coupled to the second passageway of the second connection member at the second passageway of the second connection member.

14. The system according to claim 13, wherein the first valve is a quick disconnect valve that is configured to selectively control flow of the fluid, and the second valve is a quick disconnect valve is configured to selectively control flow of the fluid; and further comprising a circulation system that couples to the first valve and the second valve to thereby selectively circulate the fluid such that the fluid flows through the first valve and through the second valve in a second flow path between the first bore and the first passageway of the first connection member and the first passageway and the second bore of the second connection member and parallel to the first flow path.

15. The system according to claim 14, wherein the circulation system is further configured to heat the fluid that is circulated by the circulation system.

16. A method of circulating a fluid through an object, the method comprising:

coupling a first connection member comprising a first tap defining a first bore therethrough and configured to extend through a housing of the object, and comprising a body comprising a first passageway and a second passageway, the first passageway fluidly connected to the second passageway and the first bore through an interior of the body, the second passageway configured to fluidly communicate with the first bore;

coupling a second connection member comprising a second tap defining a second bore therethrough and configured to extend through the housing of the object, and comprising a body comprising a first passageway and a second passageway, the first passageway fluidly connected to the second passageway and the second bore through an interior of the body, the second passageway configured to fluidly communicate with the second bore;

coupling a sight gauge assembly that has a sight tube defining a hollow interior to the first passageway of the first connection member and to the first passageway of the second connection member to define a first flow path through the hollow interior of the sight tube between the first bore and the first passageway of the first connection member and the first passageway and the second bore of the second connection member;

coupling a first accessory to the second passageway of the first connection member such that the first accessory is fluidly connected to the first flow path;

coupling a second accessory to the second passageway of the second connection member such that the second accessory is fluidly connected to the first flow path;

coupling a circulation system to the first accessory and the second accessory to define a second flow path parallel to the first flow path and between the first connection member and the second connection member; and circulating the fluid from the object in the second flow path with the circulation system, the fluid circulating in the second flow path out of the object through the second connection member and the second accessory and back into the object through the first accessory and the first connection member.

17. The method according to claim 16 further comprising, wherein the first connection member further comprises a third passageway that fluidly communicates with the first and the second flow paths; and further comprising:

coupling a device adapter to the third passageway; and coupling a ventilation device to the third passageway to vent at least one of the first flow path and the second flow path.

* * * * *